United States Patent [19]

Harre

[11] Patent Number: 5,291,458
[45] Date of Patent: Mar. 1, 1994

[54] METHOD OF DETERMINING DEPTH VALUES FOR THE SURFACE PROFILE OF THE BOTTOM OF A BODY OF WATER

[75] Inventor: Ingo Harre, Bremen, Fed. Rep. of Germany

[73] Assignee: Atlas Elektronik GmbH, Bremen, Fed. Rep. of Germany

[21] Appl. No.: 24,350

[22] Filed: Mar. 1, 1993

[30] Foreign Application Priority Data

Mar. 11, 1992 [DE] Fed. Rep. of Germany ....... 4207716

[51] Int. Cl.⁵ ............................................. G01S 15/89
[52] U.S. Cl. ...................................................... 367/88
[58] Field of Search ............................ 367/88, 13, 902

[56] References Cited

U.S. PATENT DOCUMENTS 4,611,313 9/1986 Ziese ..................... 367/88

Primary Examiner—Daniel T. Pihulic
Attorney, Agent, or Firm—Spencer, Frank & Schneider

[57] ABSTRACT

A method of determining depth values for the bottom profile of a body of water from pulse transit times and sounding directions by means of a fan beam echo sounder that measures transversely to the longitudinal axis of the ship, whose transducer array is installed at an angle obliquely to the vertical elevation axis of the ship and wherein the pulse transit times are measured and stored in association with the sounding directions, with the sounding directions $a_{oi}$ being calculated from data furnished by the transducer array and by the transducer signals as well as by means of a predeterminable sound velocity $c_o$ at the surface of the transducer array. For each transducer array, selected depth values are determined in the vertical sounding direction $a_{ov}$ and in a sounding direction $a_{On}$ that is normal to the plane of the transducer array. Estimated depth values for an estimated profile are determined for all remaining sounding directions $a_{Oi}$ by means of the selected depth values of the profile of the bottom of the body of water. For at least one of the remaining sounding directions, the estimated depth value is compared with the depth value determined as the depth measurement value from the measured pulse transit time and a correction factor k is determined for the sound velocity $c_O$. The depth values for the bottom profile of the body of water are determined from the stored pulse transit times and from the sounding directions calculated for the corrected sound velocity $c_1$.

6 Claims, 2 Drawing Sheets

METHOD OF DETERMINING DEPTH VALUES FOR THE SURFACE PROFILE OF THE BOTTOM OF A BODY OF WATER

CROSS REFERENCE TO RELATED APPLICATION

This application claims the priority of application Ser. No. P 42 07 716.8, filed Mar. 11, 1992, in the Federal Republic of Germany, the subject matter of which is incorporated herein by reference.

BACKGROUND OF THE INVENTION

The present invention relates to a method of determining depth values for the bottom profile of a body of water from pulse transit times and sounding directions by means of a fan beam echo sounder that measures transversely to the longitudinal axis of the ship, whose transducer array is installed in each case at an angle obliquely to the vertical elevation axis of the ship and wherein the pulse transit times are measured and stored in association with the sounding directions, with the sounding directions $a_{oi}$ being calculated from data furnished by the transducer array and by the transducer signals as well as by means of a predeterminable sound velocity $c_o$ at the surface of the transducer array.

To ensure the safety of shipping lanes, it is necessary to precisely monitor and record the depth of bodies of water that are dependent on flow. For this purposes, maps of the bottom profile of the body of water are generally produced by means of echo soundings. In the past, it has been the custom to employ individual beam echo sounders with which the bottom profile of the body of water was covered dot by dot by means of vertical soundings, with several transducers attached to lateral outrigger arms recording and processing echo signals in parallel operation. More recently, there has been an increased use of fan beam echo sounders in which a transducer array simultaneously processes a plurality of sounding directions. Due to the absence of outrigger arms, vessels equipped with fan beam echo sounders are able to travel very quickly on their measuring trips in which case. However, the sounding directions are no longer vertical but extend obliquely to the sides transversely to the longitudinal axis of the ship. Since high demands are placed on accuracy if more than eighty sounding directions are involved and water depths to more than 10,000 m, the sounding directions must be set very precisely.

European Patent 0,140,258, which corresponds to U.S. Pat. No. 4,611,313, discloses the use of a fan beam echo sounder for the determination of bottom profiles. For a determination of depth values, the transmitted sound beams in that arrangement are directed out to the sides transversely to the longitudinal direction of the ship at a large beam angle and in the direction of travel at a very narrow beam angle so that a narrow strip of the bottom profile is covered with sound. By electronic processing in a receiving device, a fan of narrow received beams is then oriented onto the bottom profile strip being surveyed so as to pick up the reflected and back-scattered pulse signals. From the set sounding direction of the received beams and the pulse transit time, the depth value of a quasi dot-shaped element in the strip of the water bottom profile can then be determined. The precise position of this element and thus the precise determination and association of the depth value is decisively dependent on the predetermined sounding direction.

Although European Patent 0,140,258 (U.S. Pat. No. 4,611,313) discloses the surveying of the bottom profile of a body of water by means of a fan beam echo sounder and to determine depth values from the transit times of the received echoes on the basis of the oblique sounding directions, the curved path of the sound beam caused by changes in the sound velocity as a result of the depth of the water and its salt content lead to considerable measuring inaccuracies in the determination of the depth values. These measuring inaccuracies are compensated by pivoting the sounding fan and making a calibration measurement to compensate for the distortions in the measuring results due to the curvatures in the sound beam. However, the prior art method does not consider a measuring error caused by the direction formation of the transducer array.

For a determination of the sounding directions of the transducer array from the individual fan sectors, an assumed sound velocity directly at the surface of the transducers is considered. If it is in error, the sounding directions and the depth values determined therefrom will be faulty. According to the prior art the sound velocity is measured, for example, by bathythermography. Such a method is complicated and presumes that the vessel is not traveling. Sound velocity measuring probes attached underneath the vessel are also unsuitable since they furnish inconsistent and often falsified measuring results due to the flow conditions at the hull of the vessel.

SUMMARY OF THE INVENTION

It is therefore an object of the invention to provide a method of determining depth values for a profile of the bottom of a body of water by means of a fan beam echo sounder attached to a surveying vessel so as to provide an improved accuracy of the depth values at a high operating speed.

With the above object in view, the present invention resides in a method of determining depth values for the bottom profile of a body of water from pulse transit times and sounding directions by means of a fan beam echo sounder that measures transversely to the longitudinal axis of the ship, whose transducer array is installed in each case at an angle obliquely to the vertical elevation axis of the ship and wherein the pulse transit times are measured and stored in association with the sounding directions, with the sounding directions $a_{oi}$ being calculated from data furnished by the transducer array and by the transducer signals as well as by means of a predeterminable sound velocity $c_o$ at the surface of the transducer array. According to the present invention, for each transducer array, selected depth values are determined in the vertical sounding direction $a_{ov}$ and in a sounding direction $a_{on}$ that is normal to the plane of the transducer array; estimated depth values for an estimated profile are determined for all remaining sounding directions $a_{oi}$ by means of the selected depth values of the profile of the bottom of the body of water preferably as a polynomial of the second order; for at least one of the remaining sounding directions the estimated depth value is compared with the depth value determined as the depth measurement value from the measured pulse transit time and a correction factor k is determined for the sound velocity $c_o$; and the depth values for the bottom profile of the body of water are determined from the stored pulse transit times and from the sounding directions calculated for the corrected sound velocity $c_1$.

In the method according to the invention, the pulse transit times are stored and associated with the corresponding sounding directions in order to determine depth values with these data. It is then not necessary to store direct angle data for the sounding directions, instead it would be sufficient to number the angle sectors and thus be able to associate the pulse transit times of the reflected echo signals. The actual direction angle $\theta$ with respect to the normal of the array can be determined as follows at any time from the transducer array data, that is, from the spacing d of the transducer elements, the time shift $\tau$ of the individual transducer signals and the surface sound velocity $c_0$:

$$\sin\theta = \frac{c_0 \cdot \tau}{d}$$

Since the transducer spacing d is fixed by the configuration of the array and the electrical signal time shift can be determined with high precision, the sounding direction $\theta$ is decisively influenced by the predeterminable sound velocity $c_0$. Since the depth value of the just surveyed element of the bottom of the body of water is quite significantly dependent, by way of the sounding direction $\theta$, on sound velocity $c_1$ at the surface of the transducer, every error between the given sound velocity $c_0$ and the real sound velocity $c_1$ at the surface of the transducer has a direct influence on the measuring result. This error can be considered by a correction, for example a correction factor k, that can be determined from the ratio of the real sound velocity to the given sound velocity. For this purpose, the present invention provides for the evaluation of selected measurements in the vertical sounding direction and in a sounding direction normal to the plane of the transducer array, that is, a sounding direction perpendicular to the plane of the transducer array. These measurements include no errors or, only a very small error in the vertical sounding direction for the relevant sound velocities, and are independent of the momentary sound velocity at the transducer surface. They are therefore suitable for an approximate derivation of depth values for all other sounding directions in that for these sounding directions the profile of the bottom of the body of water is determined as an estimated profile. The estimated profile may here be approximated by means of a polynomial. The depth values based on the measurements for all other sounding directions can now be compared with the approximate depth values from the estimated profile. A correction factor for the sound velocity at the transducer surface can then be determined from the difference between the estimated depth value and the measured depth value. By way of the correction factor, which is a measure for the deviation of the real sound velocity from the assumed sound velocity, all other sounding directions are corrected and new, more precise depth values are calculated with the associated pulse transit times.

The advantages of the method according to the present invention are that no measurements of the sound velocity at or near the transducer surface are required. These measurements, among others, require a great amount of time and sensors which must be attached to the exterior of the ship's hull. They measure the sound velocity in an area which is frequently hydrodynamically disturbed. In the method according to the present invention, however, the correction factors are determined from the measuring results themselves and require no additional sensors. No speed change maneuvers on the part of the vessel are required, for example a research ship, to obtain additional data for a correction of the measuring results. Moreover, the depth values can be evaluated in a laboratory at a later date without it being necessary to record additional data about the real sound velocity and having to evaluate them in parallel.

BRIEF DESCRIPTION OF THE DRAWINGS

The method according to the invention will now be described in greater detail for an embodiment thereof that is illustrated in the drawings in which.

DETAILED DESCRIPTION OF THE PREFERRED EMBODIMENTS

Figure 1:
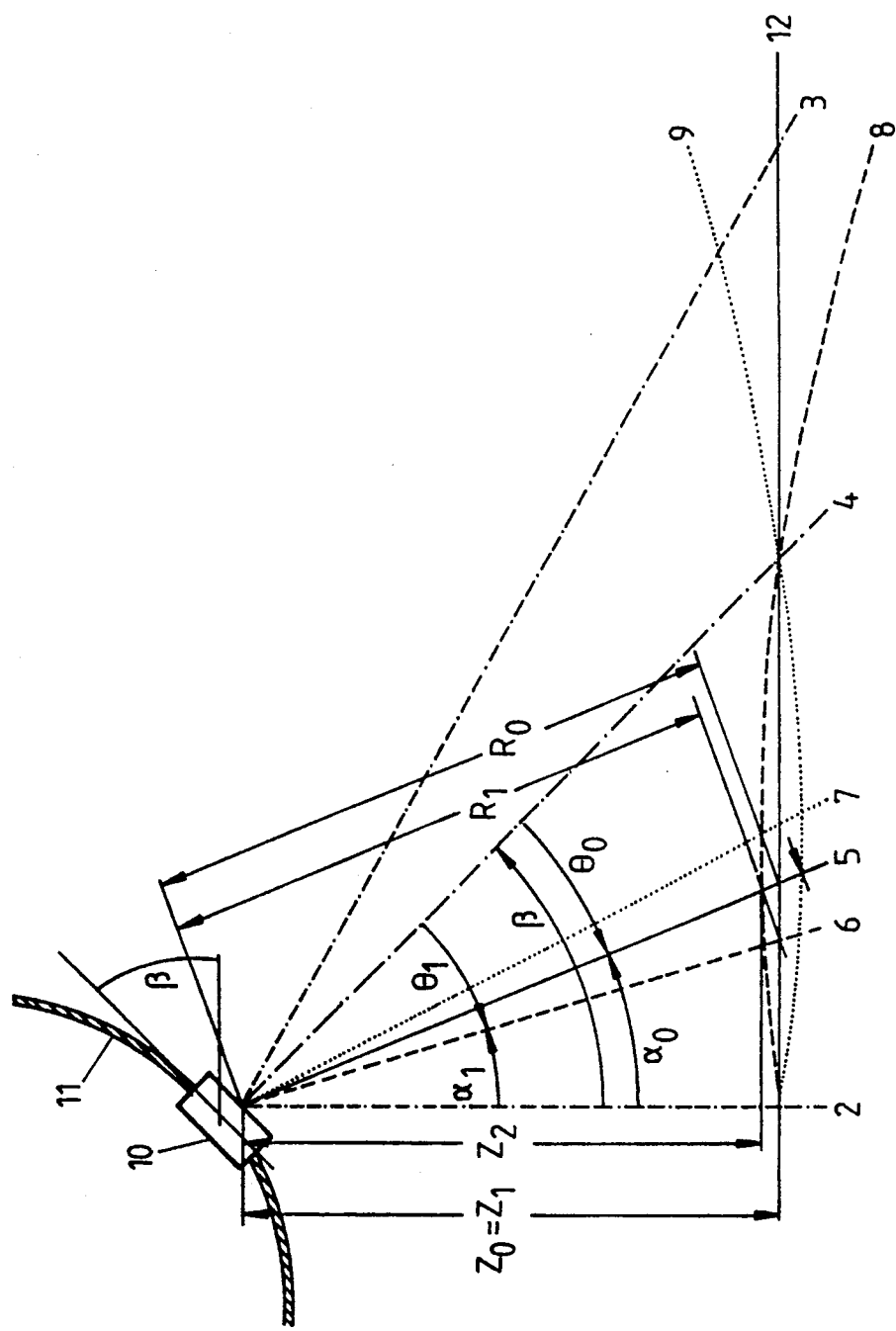
FIG. 1 is a basic sketch of real and assumed sound beams.

FIG. 1 shows the geometrical relationships for the real and assumed sound beams of a fan beam echo sounder. The known diffraction of the sound beams due to the special physical characteristics of the water here remains without consideration since the measuring error corrections based on it are of no significance for the method according to the invention and would merely have to be considered in addition.

Pulse shaped ultrasound signals from the bottom of the water are received by means of a transducer array 10 installed at the ship's hull 11 so as to slope at an angle $\beta$ relative to the horizontal. The receiving directions $\theta_0$ of transducer array 10, of which only one is represented by line 5, measured relative to the transducer normal 4, are predetermined for all echo fans and can be determined according to Equation (1) from the spacing d of the transducer elements, the sound velocity $c_0$, both generally assumed to be constant values, and by way of the delay time $\tau_0$ used for setting the direction:

$$\sin\theta_0 = \frac{c_0 \cdot \tau_0}{d} \qquad (1)$$

A measurement of the pulse transit time of the radiated and received-again echo signal multiplied by an average sound velocity applicable to the travel of the pulse signal from the transducer to the bottom of the water yields the distance $R_0$ from transducer 10 to the bottom. From it, the depth $Z_0$ can be calculated as follows:

$$Z_0 = R_0 \cdot \cos \alpha_0 \qquad (2)$$

where $\alpha_0$ is the angle of the receiving direction measured against the vertical sounding direction 2. The angle $\beta$ is also enclosed by the vertical sounding direction 2 and the transducer normal 4.

A deviation of the real sound velocity $c_1$ existing at the transducer surface compared with the assumed sound velocity $c_0$ used for the determination of the angle $\alpha_0$ results in a changed receiving direction $\alpha_1$ or $\theta_1$, respectively, corresponding to the dashed line 6. Due to the measuring of the transit time and the distance $R_1$ in direction $\alpha_1$ or $\theta_1$, respectively, determined therefrom, the calculation for the depth value $Z_2$ for the set direction $\alpha_0$ then contains an error:

$$Z_2 = R_1 \cdot \cos \alpha_0 \quad (3)$$

For this erroneously calculated depth value $Z_2$ compared to the true depth value $Z_0$ it is then possible to determine a relative error $\delta_Z$ as follows:

$$\delta_z = \frac{Z_2 - Z_1}{Z_1} = \frac{\cos\alpha_0}{\cos\alpha_1} - 1 \quad (4)$$

This applies if the assumption is correct that depth value $Z_1$ at angle $\alpha_1$ and depth value $Z_0$ at angle $\alpha_0$ do not differ from one another.

Under consideration of the transducer relationships $$\theta_0 = \alpha_1 - \beta \text{ and } \theta_0 = \alpha_0 - \beta \quad (5)$$

and the dependence of the setting of the direction on the sound velocity at the surface according to Equation (1), the following relationship can be derived directly:

$$\sin(\alpha_1 - \beta) = \frac{c_1}{c_0} \sin(\alpha_0 - \beta) \quad (6)$$

From this equation, Equation (7) can be derived as follows for the faulty direction $\alpha_1$:

$$\alpha_1 = \beta + \arcsin\left(\frac{c_1}{c_0} \cdot \sin(\alpha_0 - \beta)\right) \quad (7)$$

The relative error $\delta_Z$ from Equation (4) can thus be described as follows:

$$\delta_z = \frac{\cos\alpha_0}{\cos\left[\beta + \arcsin\left(\frac{c_1}{c_0} \cdot \sin(\alpha_0 - \beta)\right)\right]} - 1 \quad (8)$$

It can now be proved that the relative error $\delta_Z$ takes on minimum values for two distinct sounding directions $\alpha_{Oi}$ of each transducer array, namely for $\alpha_{On} = \beta$, that is, for the direction of transducer normal 4, and for $\alpha_{Ov} = 0$, that is, for the vertical sounding direction 2. Thus the depth values $Z_{On}$ and $Z_{Ov}$ determined for directions $\alpha_{On}$ and $\alpha_{Ov}$ are correct and independent of the sound velocity at the transducer surface.

Fan beam echo systems usually include two transducer arrays. If one calls the installation angle of the starboard array, with outwardly directed fan, $+\beta$, the port array is installed at an angle $-\beta$ relative to the horizontal. The two error-free measurements are therefore employed to determine a curve for an estimated profile in that a polynomial is calculated that passes through these measuring points. For the sake of simplicity a polynomial of the second order, that is, a parabolic equation is employed as the estimated profile function. In the embodiment shown in FIG. 1, the estimated profile coincides with the bottom of the water 12. A relative error $\delta_Z$ with the associated depth values $Z_2$ and $Z_0$ can now be determined from the transit time measurement and the curve of the estimated profile and can be equated with the relative error $\delta_Z$ according to Equation (8) so as to obtain the ratio $c_1/c_0$ for the real to the assumed surface velocity. This ratio $c_1/c_0$ then represents a correction factor $k = c_1/c_0$ with which the measurement of $R_1$ in sounding direction $\alpha_1$ is corrected for sounding direction $\alpha_0$, so that the following applies:

$$Z_0 = Z_1 = R_1 \cdot \cos[\beta + \arcsin(k \sin(\alpha_0 - \beta))] \quad (9)$$

That means that, for a determination of depth value $Z_1$, the initially unknown angle $\alpha_1$ is considered in the correct manner instead of the predetermined angle $\alpha_0$.

In principle, all other directions $\alpha_{Oi}$ within the permissible measuring range of the fan beam echo sounder can be utilized for a determination of the correction factor k in addition to the sounding directions $\alpha_{Ov}$ and $\alpha_{On}$ employed for the determination of the estimated profile. However, advantageously sounding directions $\alpha_{Oi}$ are selected for an average sounding direction between the vertical direction and a sounding direction normal to the transducer array so as to avoid additional influences from calculation and measuring inaccuracies as they may occur during the difference formation for a determination of the error. That is, for $\alpha_{Oi}$ the following interval is preferably assumed to exist:

$$\alpha_{Ov} < \alpha_{Oi} < \alpha_{On} \quad (10)$$

In another embodiment of the method according to the present invention, separate correction factors $k_s$ and $k_b$ are initially determined for the sounding directions of the fan beam echo sounder on the starboard side and on the port side. By averaging, this then yields the correction factor k, for example as the arithmetic mean $k = (k_b + k_s)/2$, with which the sound velocity on the surface must be corrected for the depth value determination.

According to another embodiment of the method according to the invention, an average square error D is determined which is calculated from the estimated depth value $Z_{Oi}$ and the depth measurement values $Z_{2i}$ for all sounding directions $\alpha_{Oi}$. In this calculation, the index i represents a counting variable for the identification of the fan beam echo sounding directions so that the average square error D for all directions $\alpha_{Oi}$ results as follows:

$$D = \sqrt{\frac{1}{n} \sum_{i=1}^{n} (Z_{2i} - Z_{0i})^2} \quad (11)$$

The correction factor k for the sound velocity on the surface is then varied according to the change in the average square error and the depth measurement values $Z_{2i}$ are iteratively newly calculated according to Equation (3). The correction factor k is here varied in tendency and value in such a way that the average square error becomes a minimum. The criteria and algorithms to be employed for this purpose are known in the art.

In this way, the fan beam echo sounder can be adapted at any time during operation to changing sound propagation conditions in the body of water.

Figure 2:
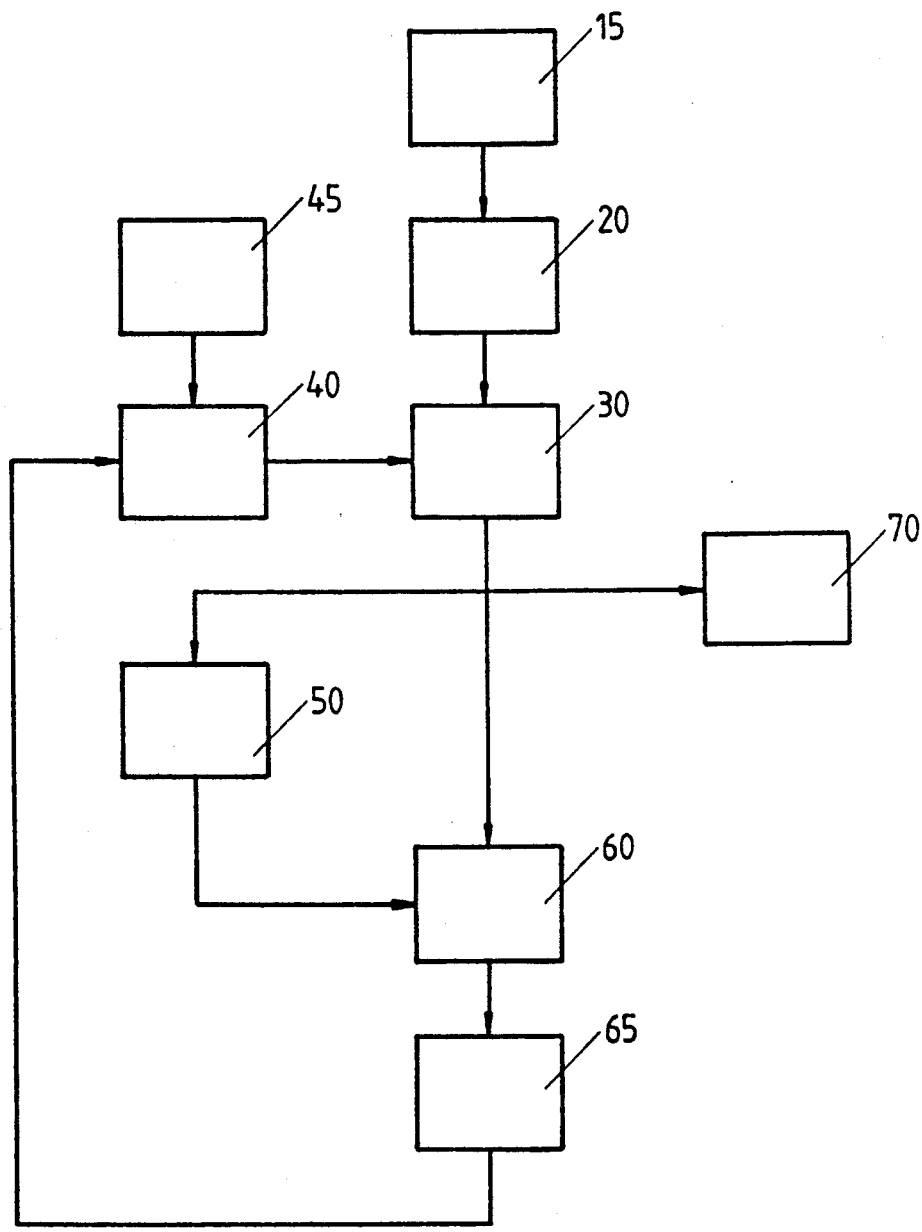
FIG. 2 is a block circuit diagram for a device suitable for the method.

FIG. 2 shows a basic block circuit diagram for one embodiment of the method for determining the depth values of the bottom profile of a body of water by means of a fan beam echo sounder system.

A transmitter/receiver 15 transmits ultrasound pulses which propagate toward the bottom of the body of water. The transmitter here has a broad directional characteristic transversely to the longitudinal axis of the ship so that all sectors of the echo fan are quasi simultaneously bombarded with the same sound pulse. The separation of sounding directions $\alpha_{Oi}$ during reception is effected by transmitter/receiver 15 which includes a transducer array 10 as shown in FIG. 1. According to Equation (1), this separation is dependent on the set signal delay $\tau_{Oi}$, the spacing of the transducer elements d and the surface sound velocity $c_0$. On the basis of the received sound pulses, the pulse transit time $t_i$ for the transmitted pulse is determined in a transit time measuring device 20 for each sounding direction $\alpha_{Oi}$. These pulse transit times $t_i$ are then converted according to Equation (9) in depth profile computer 30 to depth values $Z_{Oi}$. The sound velocities required for this calculation are made available by a sound velocity computer 40 which is connected to an input device 45, for example a viewing device equipped with a keyboard.

An estimated profile computer 50, a comparison device 60, and a depth value output unit 70 are connected to the output of depth profile computer 30, with the output of estimated profile computer 50 also being connected with comparison unit 60.

In comparison unit 60, differences are determined between the depth values of the estimated profile and the depth values of the bottom of the body of water; these are transferred to a correction computer 65 in which the correction factors required for the surface sound velocity are determined with which the sound velocity computer 40 is actuated.

From the depth values $Z_{Oi}$, $i=1, \ldots, N$, determined on the basis of measured pulse transit times $t_i$, depth values $Z_{Ov}$ and $Z_{On}$ in the vertical direction and in the sounding direction determined by the transducer normal are initially fed to estimated profile computer 50 which determines the curve of an estimated profile in the form of a square polynomial. The calculating methods customarily required to determine square polynomials from predetermined solutions, possibly also including means for compensatory calculations, are known and require no further description.

Thus measured and estimated depth values are available for all sounding directions $\alpha_{Oi}$ of the fan beam echo sounders from which the difference values are determined in comparison device 60.

Correction computer 65 may be provided with various calculation and control methods. The first two methods determine the correction factors for the surface sound velocity on the basis of a few comparison values. The surface sound velocity is corrected in sound velocity computer 40, the depth values $Z_{Oi}$ for the depth profile are recalculated with the changed surface sound velocity and are displayed or put out by way of output unit 70.

In a further correction method, the average square error between the estimated profile and the depth profile is calculated by correction computer 65 from the differences in comparison unit 60, and the value for the surface sound velocity is varied accordingly in sound velocity computer 40. The depth profile newly calculated with the corrected surface sound velocity is again compared with the estimated profile in comparison unit 60. The differences obtained in this way yield a changed average square error from whose tendency and magnitude the next correction for the surface sound velocity, which may be a correction factor or a correction summand, is determined for a repeated depth profile calculation. This iterative method is applied for the determination of the depth values until a minimum average square error, or a minimum average square error below a predetermined threshold, is obtained. The sound velocity $c_1$ at the surface of the transducer then obtained by repeated corrections coincides with the reality in the water so that the depth values for sounding directions $\alpha_{Oi}$ are also corrected accurately and represent the true course of the bottom profile of the body of water.

It will be understood that the above description of the present invention is susceptible to various modifications, changes and adaptations, and the same are intended to be comprehended within the meaning and range of equivalents of the appended claims.

What is claimed is:

1. In a method of determining depth values for the bottom profile of a body of water from pulse transit times and sounding directions by means of a fan beam echo sounder that measures transversely to the longitudinal axis of the ship, whose transducer array is installed in each case at an angle obliquely to the vertical elevation axis of the ship and wherein the pulse transit times are measured and stored in association with the sounding directions, with the sounding directions $\alpha_{Oi}$ being calculated from data furnished by the transducer array and by the transducer signals as well as by means of a predeterminable sound velocity $c_0$ at the surface of the transducer array, the steps of: determining, for each transducer array, selected depth values are determined in the vertical sounding direction $\alpha_{Ov}$ and in a sounding direction $\alpha_{On}$ that is normal to the plane of the transducer array; determining estimated depth values for an estimated profile for all remaining sounding directions $\alpha_{Oi}$ by means of the selected depth values of the profile of the bottom of the body of water; comparing, for at least one of the remaining sounding directions, the estimated depth value with the depth value determined as the depth measurement value from the measured pulse transit time and determining a correction factor k for the sound velocity $c_0$; and determining the depth values for the bottom profile of the body of water from the stored pulse transit times and from the sounding directions calculated for the corrected sound velocity $c_1$.

2. A method according to claim 1, wherein a correction factor proportional to the error between the estimated depth value and the measured depth value is determined as the correction k.

3. A method according to claim 1, wherein the estimated depth value and the measured depth value utilized for the comparison are determined for an average sounding direction between the vertical sounding direction $\alpha_{Ov}$ and the sounding direction $\alpha_{On}$ that is normal to the plane of the transducer array.

4. A method according to claim 1, wherein correction factors $k_s$ and $k_b$ are determined in each case for the average starboard sounding direction and the average port sounding direction and from them an average correction factor k is calculated; and the corrected sound velocity $c_1$ is determined by means of the average correction factor k.

5. A method according to claim 1, wherein the measured depth values are iteratively determined with the sound velocity $c_1$ as corrected by correction factor k until an average square error D between the estimated depth value and the measured depth value for all sounding directions $\alpha_{Oi}$ has been minimized, with the correction factor being varied in dependence on the average square error D.

6. A method as defined in claim 1, wherein the depth values is a polynomial of the second order.

* * * * *